United States Patent
Zsohar et al.

(10) Patent No.: US 11,102,132 B2
(45) Date of Patent: *Aug. 24, 2021

(54) EXTRACTING DATA FROM NETWORK COMMUNICATIONS

(71) Applicant: Trend Micro Incorporated, Tokyo (JP)

(72) Inventors: Leslie Zsohar, Austin, TX (US); Wei Lu, Austin, TX (US); Craig Botkin, Austin, TX (US); Randal Mullin, Austin, TX (US); Edward A. Wartha, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 458 days.

This patent is subject to a terminal disclaimer.

(21) Appl. No.: 15/782,607

(22) Filed: Oct. 12, 2017

(65) Prior Publication Data

US 2018/0034738 A1 Feb. 1, 2018

Related U.S. Application Data

(63) Continuation of application No. PCT/US2015/028596, filed on Apr. 30, 2015.

(51) Int. Cl.
*H04L 12/851* (2013.01)
*H04L 12/26* (2006.01)
*H04L 29/06* (2006.01)

(52) U.S. Cl.
CPC ........ *H04L 47/2441* (2013.01); *H04L 43/026* (2013.01); *H04L 43/028* (2013.01); *H04L 43/04* (2013.01); *H04L 47/2483* (2013.01); *H04L 69/22* (2013.01); *H04L 43/06* (2013.01); *H04L 69/12* (2013.01)

(58) Field of Classification Search
CPC ..... H04L 69/22; H04L 43/028; H04L 43/026; H04L 47/24; H04L 47/2483; H04L 43/04; H04L 43/06; H04L 47/2441; H04L 69/12
USPC .......................................................... 370/392
See application file for complete search history.

(56) References Cited

U.S. PATENT DOCUMENTS

| 8,937,942 B1 | 1/2015 | Xianzhi et al. |
| 2011/0211593 A1 | 9/2011 | Pepper et al. |
| 2012/0197847 A1* | 8/2012 | Yang ................. G06F 17/30017 |
| | | 707/679 |

(Continued)

FOREIGN PATENT DOCUMENTS

KR    10-2006-0063564    6/2006

*Primary Examiner* — Rownak Islam
(74) *Attorney, Agent, or Firm* — Okamoto & Benedicto LLP (57) ABSTRACT

Examples relate to extracting data from network communications. In one example, a programmable hardware processor may: receive a first set of network packets; store each network packet included in the first set in a first storage device; identify, from each network packet included in a subset of the first set of network packets, data included in the network packet, the data meeting at least one condition defined by first programmable logic of the programmable hardware processor; and for each network packet included in the subset: extract, from the network packet, data of interest; and store, in a second storage device, i) the extracted data of interest, and ii) an identifier associated with the network packet.

15 Claims, 4 Drawing Sheets

(56) References Cited

U.S. PATENT DOCUMENTS

| | | |
|---|---|---|
| 2013/0194949 A1 | 8/2013 | Ruddick et al. |
| 2014/0307555 A1* | 10/2014 | DeCusatis ............... H04L 47/39 370/236 |
| 2015/0029946 A1 | 1/2015 | Luna |
| 2016/0295507 A1* | 10/2016 | Sengupta ............. G06F 1/3293 |

* cited by examiner

EXTRACTING DATA FROM NETWORK COMMUNICATIONS

CROSS-REFERENCE TO RELATED APPLICATION

This application is a continuation of International Application No. PCT/US2015/028596, with an International Filing Date of Apr. 30, 2015, which is incorporated herein by reference in its entirety.

BACKGROUND

Network communications between computing devices are often carried out by transmitting network packets from one device to another, e.g., using a packet-switched network. Many different types of network packets having a variety of characteristics may be transmitted between computing devices. Network administrators often monitor various aspects of network traffic going into and out of their respectively managed networks, e.g., looking for problems or anomalies, such as malfunctioning or misconfigured devices, or malicious actors.

BRIEF DESCRIPTION OF THE DRAWINGS

The following detailed description references the drawings, wherein.

DETAILED DESCRIPTION

A significant volume and variety of network traffic often flows between computing devices operating on a packet-switched network. Using one or more devices having programmable hardware processors, such as a field-programmable gate array (FPGA), network traffic and the data included in network packets may be captured, stored, organized, and filtered as it flows through a network. In particular, data of interest included in individual network packets may be extracted and stored for later analysis, e.g., for analytics and/or security purposes. In some implementations, using multi-stage storage, with dynamically configurable filtering and purging at each stage, may facilitate analysis of network data of interest in a manner designed to be relatively fast and efficient.

For example, a network device may use an FPGA configured to process all network traffic that flows through it. The FPGA may identify, for each network packet processed, a network flow for the packet. Network flows generally include related network packets, e.g., network packets used to send an e-mail may be considered part of the same network flow. All of the packets may be stored in a first data storage device, indexed by their corresponding network flow. Packets belonging to a network flow may not be received by the FPGA in sequential order and may be separated by relatively long periods of time and/or other network packets. When additional packets belonging to an existing network flow are received by the FPGA, they may be indexed according to the existing network flow and stored in the first storage device.

The FPGA may then identify and extract data of interest included in the network packets stored in the first storage device. For example, the FPGA may be configured using programmable logic that defines various conditions that, if met by data included in a network packet, will result in the FPGA extracting data of interest from the packet. E.g., in situations where e-mail attachments are data of interest, an FPGA may be configured to identify e-mail packets that include attachments. The data extracted from the e-mail packet(s) may vary, and may include, for example, the sender's address, the recipient's address, and the attachment data included in the email packet. In situations where data of interest, such as an e-mail attachment, is split across multiple packets, each part may be identified, extracted, and stored, and in some implementations combined to produce the entire data of interest.

The extracted data of interest may, for example, be stored in a second stage storage device and/or provided to a third party for analysis. The types of storage devices used at different stages of storage may vary, and the first stage of storage may be designed to store all or a subset of the received packets quickly and for a relatively short period of time. Due to the volume of incoming network packets, the first stage of storage may be periodically cleared and/or overwritten by more recently received network packets. Prior to network packets being cleared from or overwritten in the first storage device, the FPGA may identify and extract data of interest from the packets. In some implementations, remaining data—the data not extracted—may be removed from storage. The second storage device, e.g., where data extracted from network packets is stored, may be designed to store the data of interest for a relatively moderate period of time, e.g., a period of time longer than packets are stored at the first stage, to make packets stored at the second stage available for analysis by a third party device/system.

In some implementations, additional stages of storage may be used. As with the first storage device, the second storage device may be periodically cleared and/or overwritten by more recently received network packets/flows/data of interest. Prior to the network packets/flows/data of interest being cleared and/or overwritten, the FPGA may identify a subset of the network packets/flows/data of interest to be stored in a third data storage device. Many variations may be used to filter network packets and/or network data at various stages. As one example, the FPGA may be configured to store all POP and IMAP network packets in the first stage of storage, and then identify, from the first stage of storage, POP and IMAP network packets that include attachments and store the packets in the second stage of storage. The FPGA may extract the attachments from the POP and IMAP packets stored in the second stage to store them in a third stage of storage. The network flows/packets/data stored at each stage may vary based upon the configuration of the FPGA.

In situations where it is used, a third storage device may be designed to store network packets and/or data of interest for a relatively long period of time, e.g., a period of time longer than packets are stored at the second stage, to make data stored at the third stage available for analysis or other use by a third party device/system and/or for permanent storage. The data stored at the third stage may be indexed, for example, according to the network flow and/or network packet from which it was extracted.

The characteristics of interest used to identify network packets and flows of interest, and the data that meets conditions leading to data extraction, are based on the configuration of the FPGA: The configuration may be defined by programmable logic and may be specified, for example, by a third party device and/or a system administrator. In some situations, the data of interest extracted and stored at a particular stage may have a correlation to network packet characteristics of interest of a previous stage, e.g., an FPGA may store FTP network packets in a first stage of storage based on their protocol, FTP, and data of interest extracted from the FTP network packets and stored in a second stage of storage may include a file or files included in the FTP packets.

As noted above, the hardware processor or processors used to selectively store and organize the network packets and extract network data of interest may be configured in a variety of ways. Changing the configuration of the hardware processor(s) may allow for extraction and storage of network data in different ways. Additional details regarding the extraction of data from network packets are described in further detail in the paragraphs that follow.

Figure 1:
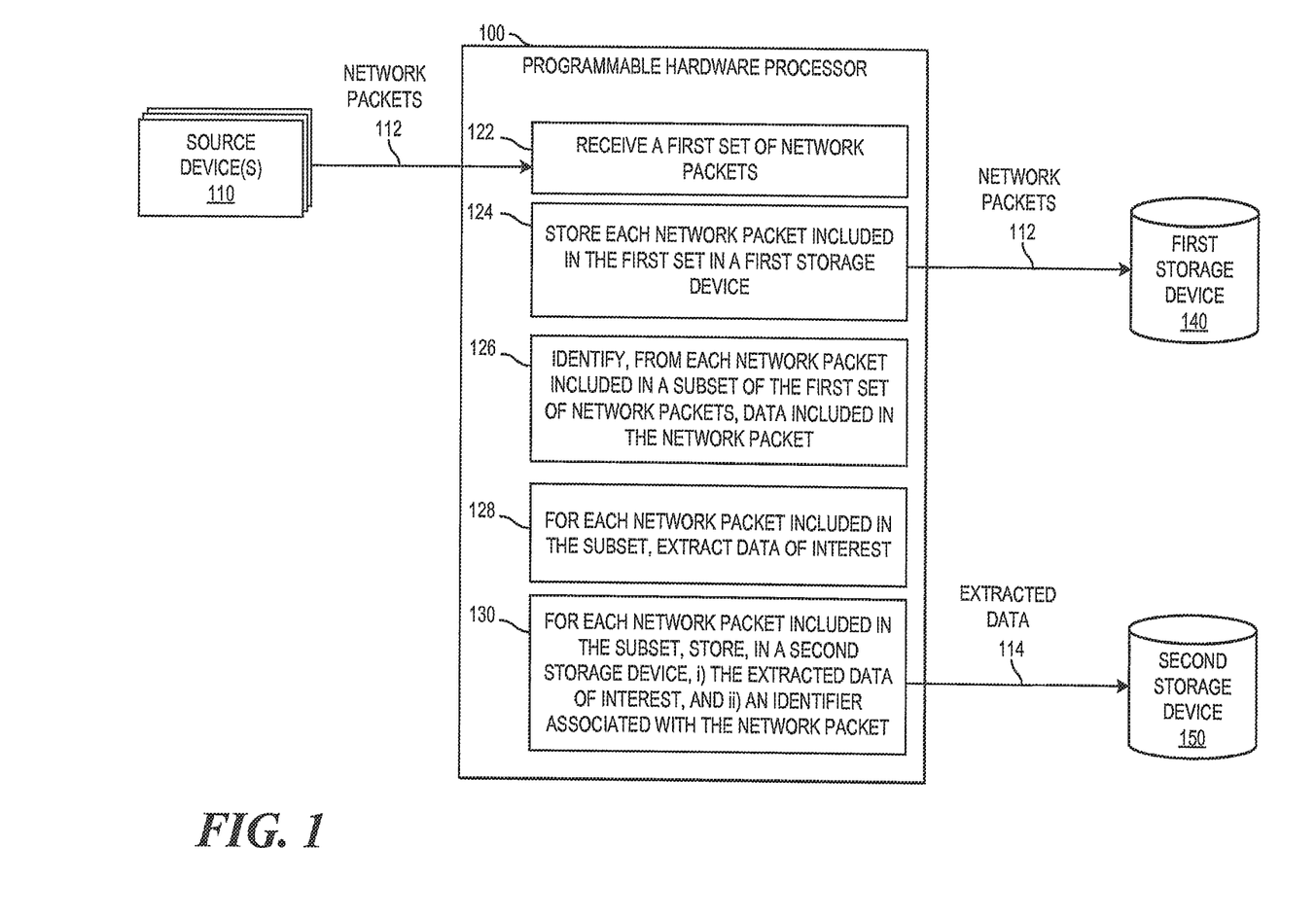
FIG. 1 is a block diagram of an example programmable hardware processor for extracting data from network communications.

FIG. 1 is a block diagram of an example programmable hardware processor 100 for extracting data from network communications. Programmable hardware processor 100 may be included, for example, in network device, such as a standalone network device, a network switch, router, or any other suitable device through which network packets flow in a packet-switched network.

Programmable hardware processor 100 may include one or more electronic circuits that include electronic components for performing actions, such as actions 122-130. The programmable hardware processor 100 may be, for example, an FPGA, an application-specific integrated circuit (ASIC), an application-specific instruction set processor (ASIP), a complex programmable logic device (CPLD), to name a few. In some implementations, multiple programmable hardware processors, of the same type or combination of types, may be used, e.g., to perform actions 122-130.

Data storage devices, such as the first storage device 140 and the second storage device 150 may be any electronic, magnetic, optical, or other physical storage device that may contain or store data. Storage devices 140 and 150 may be, for example, Random Access Memory (RAM), an Electrically Erasable Programmable Read-Only Memory (EEPROM), an optical disc, a solid state drive (SSD), a magnetic hard drive, and the like.

As shown in FIG. 1, the programmable hardware processor 100 receives a first set of network packets 112 from a source device 110 (122). The set of network packets 112 may include, for example, any combination of TCP/IP, UDP, SMTP, ICMP, HTTP, POP, FTP, IMAP, or another type of network packet, which generally comprises a header portion and a payload portion. The source device 110 may be any device through which network packets are transmitted, such as a personal computer, mobile phone, server computer, network router, network switch, or other computing device or network device from which the network packets 112 are received.

In some implementations, the programmable hardware processor 100 identifies a network flow for each network packet included in the first set. Each network flow includes at least one of the network packets included in the first set. For example, network packets may be related—and be identified as part of the same network flow—based on a variety of characteristics and/or combinations of characteristics. For example, network packets having the same source and destination address, network packets having the same source port and destination port, and/or network packets having the same network protocol, may be identified as being part of the same flow. The exact manner in which the programmable hardware processor 100 identifies packets as belonging to a flow may vary, and may be specified by a configuration for the programmable hardware processor 100. In some implementations, a network flow may include only one network packet.

The programmable hardware processor 100 stores each network packet included in the first set in a first storage device 140 (124). The first data storage device 140 may be, for example, RAM which is designed to quickly store received network packets 112. In situations where network traffic is relatively high, having a relatively fast storage device may facilitate the ability to store all or a large subset of the network packets 112 received by the programmable hardware processor 100. In some implementations, the programmable hardware processor 100 may selectively store a subset of the received network packets 112 in the first data storage device 140 based on one or more characteristics of the network packets. For example, certain types of packets may be whitelisted, indicating that there is no need to store them for further analysis. As another example, only packets that include data of a certain type may be selected for storing. The subset of received packets chosen for storage, or not chosen, may vary, and may depend upon the configuration of the programmable hardware processor 100, which may change, e.g., based on instructions received from a third party device.

The programmable hardware processor 100 identifies, from each network packet included in a subset of the first set of network packets, data included in the network packet (126). The data meets at least one condition defined by programmable logic of the programmable hardware processor 100. For example, when an FPGA processes a network packet, the programmable logic of the FPGA may define conditions that must be met by the network packet for the network packet to be eligible for data extraction. Example conditions may be that the network packet has a certain protocol type, such as FTP, and/or that the source and/or destination address of the network packet matches a certain IP address or is within a certain range of IP addresses. In some implementations, the data that meets the conditions, such as the protocol type and/or destination IP address, may be included in network packet header data, payload data, footer data, and/or metadata. The subset of the received network packets that the FPGA identifies as meeting the conditions are eligible for data extraction, while network packets that do not meet the conditions may be ignored, discarded, or removed from storage.

For each network packet included in the subset, the programmable hardware processor 100 extracts data of interest (128). The data of interest need not be the data that matched the conditions specified by the programmable hardware processor 100. For example, conditions defined by programmable logic of an FPGA may result in DNS query packets being eligible for data extraction, e.g., example conditions may be that packets use UDP protocol, a particular port associated with DNS protocol, and that the source IP address is in a set or range of private network address. After identifying a subset of network packets as DNS query packets, the programmable logic of the FPGA may cause the FPGA to extract, from the DNS query packets, the query domain name and source IP address specified by the identified DNS query packets.

The data of interest extracted from network packets may vary and, in some implementations, may include network packet header data, payload data, footer data, and/or metadata. By way of example, network packet header data may include the sender's IP and/or MAC address, network packet payload data may include a file being transferred, network packet footer data may include error checking data, and network packet metadata may include network packet or attachment size. Example data of interest may also include the recipient's IP or MAC address, a web browser type, a user device type, a DNS query domain name, a DNS response IP address, an SMTP sender name, an SMTP recipient name, an FTP file name, and/or an FTP file type, to name a few.

For each network packet included in the subset, the programmable hardware processor 100 stores, in a second storage device 150, i) the extracted data 114 of interest, and ii) an identifier associated with the network packet. In this situation, the data of interest extracted from each network packet that met conditions of the programmable hardware processor 100 is stored in the second data storage device 150. The identifier may be used to identify and organize the data and may, for example, identify the network flow that included the network packet from which the data was extracted.

The second data storage device 150 may be, for example, an SSD device, which is designed to hold data for a relatively moderate period of time. Extracted data 114 stored in the second storage device 150 may be made available for inspection by a third party device, e.g., to analyze the data for malware, prior to the data being purged, overwritten, or moved to another storage device. In some implementations, additional programmable hardware processors and/or third party computing devices may identify data of interest to be moved to the second data storage device 150, e.g., based on different conditions, different data of interest, and/or user selection.

In implementations where network flows are identified for the network packets 112, the programmable hardware processor 100 may organize each network packet according to its corresponding network flow. In some implementations, each extracted data 114, e.g., when stored with an identifier associated with a network flow, may be organized according to its corresponding network flow. Organizing network packets and network data according to network flows may facilitate identification of data requested by a user or third party device.

Incoming network packets 112, while described as being received as part of a set, may, in some situations, be part of a stream of network packets received and processed by the programmable hardware processor 100. In some implementations, packets may be processed serially, e.g., as they are received, and related packets belonging to the same network flow as other network packets may be received out of order and/or with unrelated network packets in between. Organizing the network packets 112 and extracted data 114 stored in the first and second data storage devices may include, for example, using one or more of a variety of indexing and/or sorting methods to sort, index, or otherwise organize the network packets/data. As noted above, organization of the network packets/data, e.g., in an index, may facilitate retrieval of particular network flows/packets/data, e.g., by third party device or system. The organization may also facilitate associating packets with one another, e.g., packets of an existing network flow that arrive later in time may be associated and stored with the other network packets of the existing network flow.

In some situations, individual network packets may each contain a different part of a whole piece of data. For example, due to limited network packet size, sending a file across a network, e.g., using FTP, may require multiple network packets, each network packet containing a portion of the file. In some implementations, the programmable hardware processor 100 may determine that data of interest identified in a particular network packet is partial data. In this situation, the programmable hardware processor may then identify a network flow in which the particular network packet is included and identify, within the network flow, each other network packet that includes other partial data that, when combined with the partial data of the particular packet, make the data of interest. Partial data extracted from the network packets may be combined, and the combined data stored in a storage device, such as the second storage device 150. The ability to extract and combine partial data from network packets facilitates the extraction of specific data of interest when data spans multiple network packets.

In some implementations, as indicated above, the received network packets may be selectively stored, e.g., in the first storage device 140, based on various characteristics of the network packets and/or network flows that include the network packets. For example, the programmable hardware processor 100 may identify a set of network flows that have at least one characteristic of interest. In some implementations, the characteristics are dynamically updateable and include, for example, a network packet protocol characteristic and/or a network packet content characteristic, e.g., for identifying packets of a certain protocol type, or packets including particular content, as a packet of interest. Characteristics of interest may include, for example: particular characteristics which may be indicative of malware, e.g., identified based on deep inspection of the packets and blacklist comparisons; unexpected volume of network traffic, e.g., from a network device that was previously identified as suspicious; unexpected volume of network traffic between any two network devices; and/or flow constructions that indicate intent to bypass or mislead network security devices and/or administrators.

The actions performed by the programmable hardware processor with respect to the storage of network packets, and the extraction and storage of network data, may vary. For example, separate programmable logic may be obtained for the programmable hardware processor 100 which defines different conditions or characteristics of interest used to determine which network packets are stored and/or which network data is extracted and stored at various stages of storage. The conditions used to identify packets containing data of interest, and the data of interest extracted from those packets, may be changed, for example, by changing the configuration of the programmable hardware processor 100.

In some implementations, additional configurations are stored in a storage device accessible to the programmable hardware processor 100, and may be applied, for example, based on various triggering conditions and/or third party provided instructions. In some implementations, the programmable hardware processor 100 may be in communication with additional programmable processors and/or third party computing devices that analyze network flows/packets stored in the first data storage device 140. In this situation, the additional programmable processor(s) and/or third party computing device(s) may facilitate identification of network flows or packets having characteristics or data of interest. By way of example, a third party computing device may analyze the content of network flows looking for packet content included in a security blacklist. Upon identification of content included in the security blacklist, or identification of other characteristics of interest, the third party computing device may cause the extraction and storage of certain data, such as the network packet source IP address or MAC address.

In some implementations, the programmable hardware processor 100 may receive, subsequent to receiving the first set of network packets 112, a second set of network packets. As with the first set of network packets 112, packets included in the second set may be stored and, in some implementations, organized according to their respective network flows. A second subset of the second set of packets may be identified, e.g., based on each packet of the second subset including data that meets at least one condition defined by the second programmable logic of the programmable hardware processor 100. Because the second programmable logic defines at least one condition that is different from the first programmable logic, the network data that meets the condition(s) may also be different. As with the first subset, second data of interest—which may be different from the first data of interest—is extracted from the network packets in the second subset and stored with an identifier in the second storage device 150.

In situations where a packet in the second set is in the same network flow as an existing packet or packets stored in the first and/or second storage device, the packet may be stored in accordance with the same network flow. In situations where the packets in the second set are not associated with an existing network flow, they may be stored and organized in accordance with their newly identified network flows.

When storing subsequently received network packets in the first data storage device 140, previously stored packets may need to be removed from the first storage device 140 or overwritten by the subsequently received network packets. For example, to ensure time for identifying packets having characteristics or data of interest, packets stored in the first data storage device 140 may be removed or overwritten in a first-in, first-out manner, e.g., the packets stored for the longest period of time are the first to be removed or overwritten by new packets.

In some implementations, one or more additional storage devices may be used to store packets having particular characteristics. For example, the programmable hardware processor 100 may identify packets included in the first data storage device 150 that have one or more characteristics of interest. After identifying the packets having the characteristics of interest, they may be stored in an intermediate storage device.

By way of example, an FPGA with three stages of storage may store every IMAP packet received in a first stage of storage, e.g., in RAM organized by their corresponding network flows. From the IMAP packets stored at the first stage, the FPGA may identify individual IMAP packets having data of interest, e.g., the packets of an IMAP flow containing a portion of an executable file, and store those individual IMAP packets in a second stage of storage, e.g., an SSD. From the individual IMAP packets that each include a portion of an executable file, the FPGA may extract the portion of data, combine it with other partial data to form the whole executable, and store the executable along with the sender and recipient addresses in a third storage device, e.g., a magnetic hard drive. At each stage of storage, the packets and/or data may be available for inspection by a third party device. For example, a malware detection device may be looking for malware in IMAP packets and isolation of particular IMAP flows/packets/data may facilitate identification of malware by the detection device.

The example implementation of the programmable hardware processor 100 and other devices depicted in FIG. 1 may vary. For example, in some implementations, multiple programmable hardware processors may be used to perform various actions, e.g., actions 122-130. In some implementations, the order in which actions are performed may vary. For example, the identification of data matching particular condition(s) may be performed before storing network packets in the first storage device 140, e.g., leading to network packets 112 only being stored in the first storage device 140 if they meet the condition(s). In some implementations, each data storage device, e.g., 140 and 150, may be one or more storage devices, e.g., multiple RAM modules and/or hard drive arrays. Other configurations may also be used to extract data from network communications.

Figure 2:
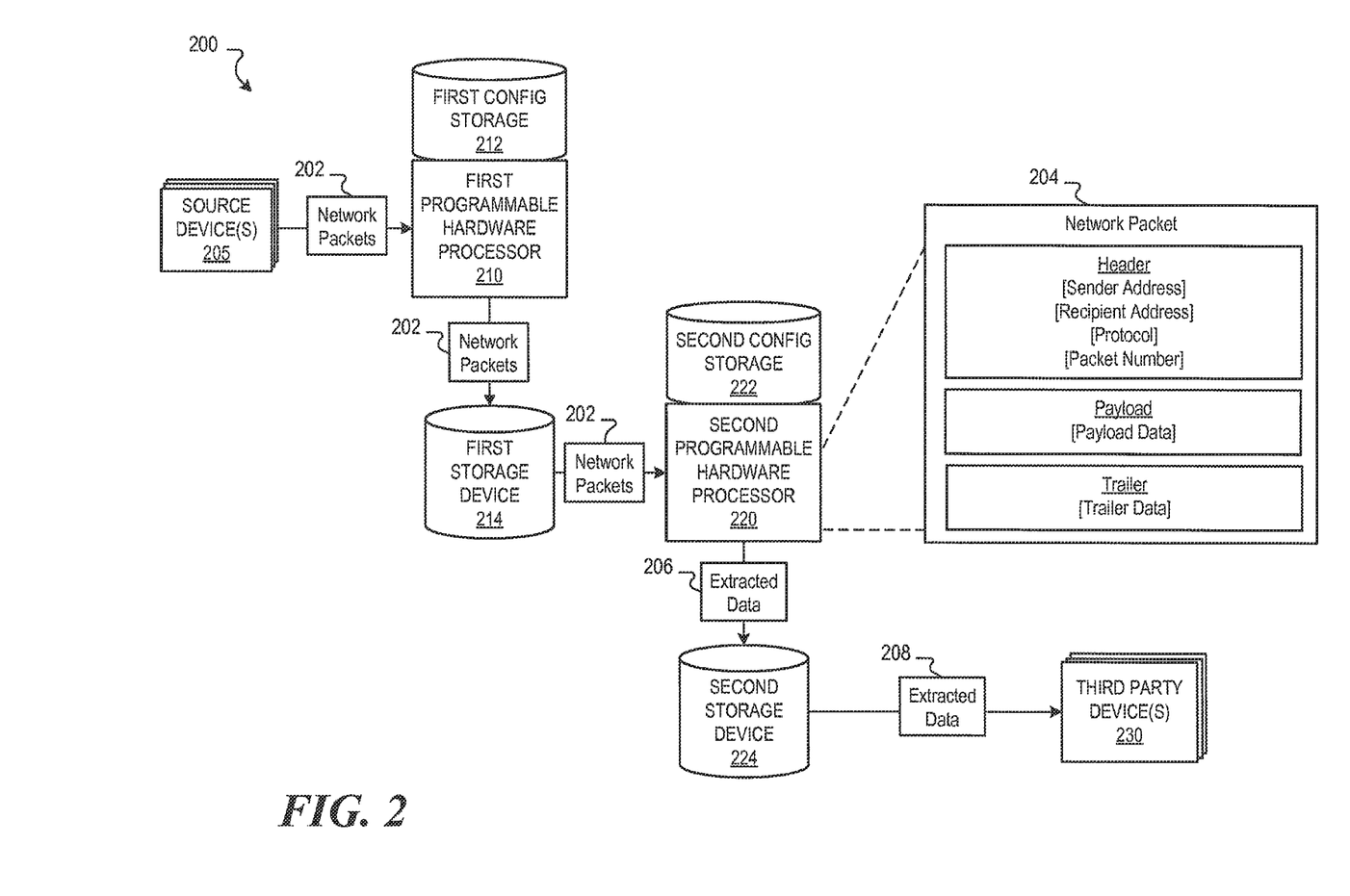
FIG. 2 is an example data flow for extracting data from network communications using multiple programmable hardware processors.

FIG. 2 is an example data flow 200 for extracting data from network communications using multiple programmable hardware processors. In the example data flow 200, one or more source device(s) 205 provide network packets 202 to a first programmable processor 210. The source devices 205 may be any devices capable of transmitting network packets, e.g., border routers at the edge of a network, network switches, server computers, and load balancers, to name a few. The first programmable processor 210 is coupled to a first configuration storage device 212 that may include one or more configurations for the first programmable processor 210. Each configuration includes programmable logic which, when implemented by the first programmable processor 210, may vary from other configurations in the manner in which they cause network packets and data included in the network packets to be handled.

The first programmable processor 210 stores each of the received network packets 202 in a first storage device 214. The network packets 202 may, in some implementations, be organized according to their corresponding network flows, e.g., as identified by the first programmable processor 210. In some implementations, each network packet 202 is also associated with a timestamp, which may indicate when the network packet 202 was received or stored in the first storage device 214. In implementations where the first programmable processor 210 is configured to selectively store the received network packets 202, only a subset of the received network packets 202 may be stored in the first storage device 214.

A second programmable hardware processor 220 receives the network packets 202 from the first storage device 214 and identifies network packets that include data meeting at least one condition defined by programmable logic of the second programmable processor 220. The second programmable processor 220 may be configured in a variety of ways to identify a variety of packet data as data meeting one or more condition(s) defined by the current configuration. The various configurations may be stored, for example, in the second configuration storage 222 and may be applied at the instructions of a third party device, such as a user device controlling the second programmable hardware processor 220.

From the identified network packets, the second programmable processor 220 extracts data of interest. The selection of data 206 to be extracted from the network packets may depend upon the configuration of the second programmable processor 220 which, as indicated above, may vary, e.g., allowing for a variety of options for selecting which data is extracted from network packets.

The example data flow 200 depicts an illustration of an example network packet 204, which includes a header portion, payload portion, and trailer portion. Each portion of the network packet may include a variety of data which may be used to meet conditions and/or may be subject to extraction. For example, the second programmable processor 220 may be configured to identify all network packets having a particular sender address as network packets meeting a condition for inclusion in a subset eligible for extraction. From each network packet having the particular sender address, the second programmable processor 220 may, by way of example, be configured to extract the recipient address and payload data.

The extracted data 206 of interest is stored in a second storage device 224 with an identifier associated with the network packet from which the data 206 was extracted. In some implementations, the second programmable hardware processor 220 organizes the extracted data 206 stored in the second storage device 224 according to the corresponding identifier(s). For example, the identifier for a particular unit of extracted data may be a network flow identifier that identifies the network flow that included the network packet from the data was extracted. Other identifiers may also be used, e.g., network packet identifier, sender identifier, or recipient identifier. Organizing the extracted data 206 according to the identifier may result, for example, in the extracted data being indexed by network flow, or sorted by sender address and timestamp.

As additional network packets flow through the example data flow 200, the storage devices, 214 and 224, may near or reach storage capacity over time. The first storage device 214, for example, may receive every network packet, or a large subset of all network packets, flowing through the first programmable hardware processor 210, which may be capable of processing network traffic exceeding 10 Gigabits per second in real or near-real time. Due to a limited storage capacity, each storage device is periodically purged of existing network packets or overwritten by incoming network packets. For example, when the first storage device 214 is at or near a particular capacity limit, new packets may overwrite the oldest packets, e.g., by using packet timestamps to overwrite the oldest packets first. The second, and any subsequent, storage devices may be managed in a similar manner, e.g., periodically clearing network packets or data and/or overwriting the oldest network packets or data with more recently received network packets. In some implementations, storage devices may be swapped for a stage of storage, such as the second stage, allowing permanent storage of all network packets or data of interest stored at a particular stage. For example, when the second storage device 224 is at capacity, the second programmable processor 220 may store extracted data 206 in a different storage device, allowing the full second storage device 224 to be kept, e.g., for backup and/or analysis purposes.

Each storage device may be accessible to one or more third party computing devices. For example, third party device(s) 230 may obtain extracted data 208 from the second storage device 224 and perform a variety of actions on the data 208. Third party device(s) 230 may, for example, include system administrator devices and/or analytics devices that use the data stored at the various stages, e.g., for performing analytics on the network data, to identify network anomalies, to identify potentially malicious network behavior, or to otherwise manage the network through which the network packets 202 flow. By way of example, by storing DNS query traffic and/or DNS query domain names, a third party analytics device may use the extracted data to identify popular DNS queries and determine DNS query trends over time. In some implementations, additional programmable processors and/or storage devices may be used, e.g., for additional stages of storage and network packet/data selection. In some implementations, one or more programmable hardware processors may be configured to identify and store network packets and/or data of interest in separate storage pipelines. For example, a programmable hardware processor may be configured to i) identify SMTP packets as packets of interest for storing in a subsequent storage device, and ii) identify HTTP packets as packets of interest for storing in a different subsequent storage device. Further processing of the SMTP packets may result in extraction of data of interest that is different from data of interest extracted from the HTTP packets. This allows, for example, the use of separate processing, storage, and analysis pipelines originating from the same set of network packets and programmable hardware processor(s).

Figure 3:
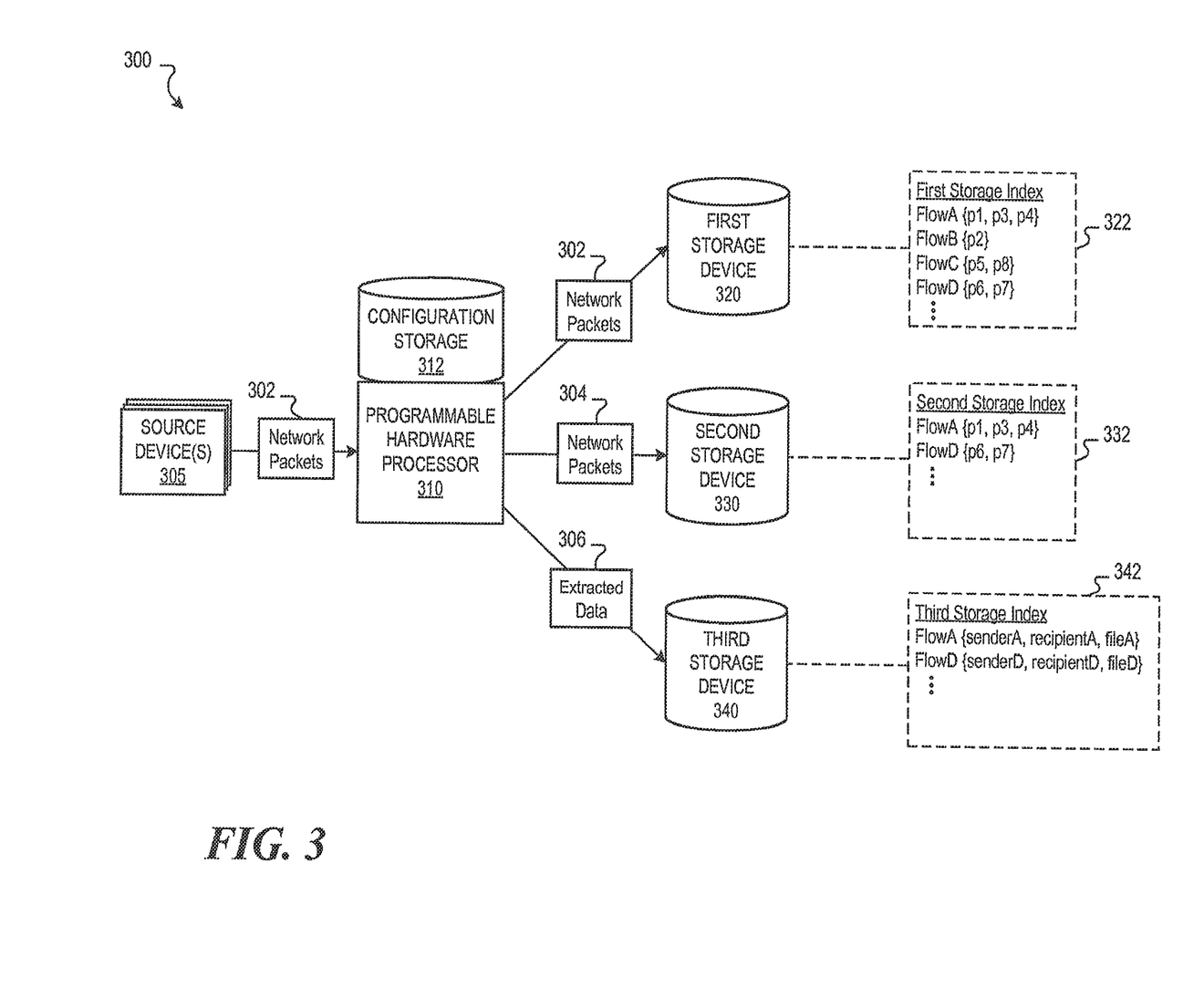
FIG. 3 is an example data flow for extracting data from network communications using a single programmable hardware processor.

FIG. 3 is an example data flow 300 for extracting data from network communications using a single programmable hardware processor 310. The actions performed by the programmable hardware processor 310 are similar to the actions performed by the programmable hardware processors described with respect to FIG. 2 above. For example, the programmable hardware processor 310 receives network packets 302 from one or more source device(s) 305, which may include network devices capable of transmitting network packets.

The programmable hardware processor 310 stores each of the received network packets 302 in a first storage device 320 and, in the example data flow 300, organizes the packets by indexing the packets according to their corresponding network flow. For example, the first storage index 322 indicates that eight packets, p1-p8, are each indexed according to one of four network flows, FlowA, B, C, and D. Additional network packets and flows may be stored and indexed in the first storage device 320, and the data stored in the first storage device 320, as well as the index 322, may change over time, e.g., as new packets are received and older packets are removed or overwritten.

The programmable hardware processor 310 stores, in the second storage device 330, network packets 304 of network flows that are identified as having one or more characteristics of interest. For example, in situations where the programmable hardware processor 310 is configured to identify SMTP network flows as packets/flows of interest, each packet of an SMTP network flow may be stored in the second storage device 330. As shown in the example second storage index 332, the packets of interest are indexed according to their corresponding network flows, e.g., FlowA, comprising packets p1, p3, and p4; and FlowD, comprising packets p6 and p7, may be SMTP network flows stored in the second storage device 330.

In some implementations, the network packets stored in later storage stages may be deleted from or overwritten in the prior storage stage. For example, to make room for storing additional packets in the first storage device 320, network packets in the first storage device 320 associated with FlowA and FlowD may be deleted or overwritten when they are moved to the second storage device 330. In some implementations, copies of the network packets are stored at each stage of storage. For example, to facilitate analysis being performed by third party devices at each stage of storage, FlowA and FlowD may remain in the first storage device 320 when they are also stored in the second storage device 330.

As shown in the example data flow 300, the programmable hardware processor 310 extracts data from the network packets 304 that were stored in the second storage device 330. The extracted data 306 is stored in the third storage device 340. As discussed above, the extracted data 306 may be selected by identifying network packets that include data meeting one or more condition(s). For example, from the SMTP packets stored in the second storage device 330, the programmable hardware processor 310 may be configured to determine which SMTP packets include executable files or compressed files, e.g., .exe and .zip files. After identifying SMTP packets that include executable or compressed files, the programmable hardware processor 310 may extract, from the SMTP packets, data of interest, such as the file(s), sender address, and recipient address.

The programmable hardware processor 310 stores, in the third storage device 340, the extracted data, along with an identifier. Using the example above, the extracted sender addresses, recipient addresses, and files are stored in the third storage device 340. In the example data flow 300, the extracted data 306 is also organized in the third storage device 340, e.g., by indexing the extracted data according to the network flow from which the data was extracted. Example extracted data of interest from two network flows, FlowA and FlowD, is depicted in the third storage index 342.

In situations where additional network packets belonging to a network flow are received, they may be stored and organized according to the existing network flows. For example, an additional packet, p9, may be received by the programmable hardware processor 310. The packet will be stored in the first storage device 320, and if the packet is identified as belonging to FlowD, for example, it will be indexed according to FlowD. If, as in the foregoing example, the additional packet is an SMTP packet, in situations where SMTP packet flows are identified as network flows of interest, p9 is also stored in the second storage device 330. In the example situation where the additional packet, p9, also includes an executable or compressed file, the data of interest may also be extracted from p9 and stored in the third storage device 340.

Additional processor configurations including programmable logic for performing various actions may be stored in the configuration storage 312 coupled to the programmable hardware processor 310. Changing the configuration may change the manner in which the programmable hardware processor 310 identifies, stores, and/or organizes network packets and data of interest. For example, in situations where a configuration update changes the conditions and data of interest, the programmable hardware processor 310 may process received packets according to the new conditions and data of interest, e.g., deleting and/or overwriting existing extracted data stored in the third storage device. As noted above, many other variations on the actions performed by the programmable hardware processor 310 exist, and may be implemented by changing the processor's configuration.

Figure 4:
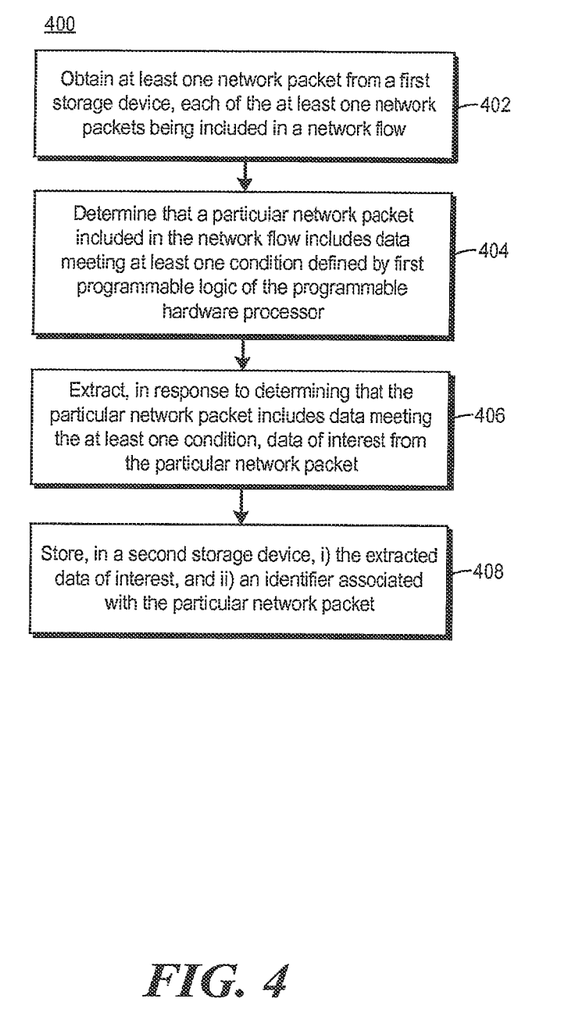
FIG. 4 is a flowchart of an example method for extracting data from network communications.

FIG. 4 is a flowchart of an example method 400 for extracting data from network communications. The method 400 may be performed by a programmable hardware processor, such as the programmable hardware processor described in FIG. 1. Other programmable hardware processors or combinations of programmable hardware processors may also be used to execute method 400. Method 400 may be implemented, for example, in the form of electronic circuitry.

At least one network packet is obtained from a first storage device, each of the at least one network packets being included in a network flow (402). In some implementations, network packets are received in one or more batches of network packets. In some implementations, network packets are received as a stream of network packets, e.g., a stream of network packets as they flow through a network. The first storage device may contain network packets that are unfiltered or filtered based on a variety of characteristics. For example, the first storage device may contain all network packets that use the SMTP protocol.

In some implementations, e.g., prior to obtaining network packets from the first storage device, a programmable processor may receive multiple network packets, identify, for each received network packet, a network flow, each network flow including at least one of the received network packets. Network packets may be identified as belonging to a network flow in a variety of ways. In some implementations, the network flow is identified based on a source and destination address of the network packet, a source and destination port for the network packet, and/or a network protocol of the network packet. As indicated above, the received network packets may be stored, with or without filtering, in the first storage device. The first storage device may be designed to function at a high rate of speed, as the ability to store network packets quickly may facilitate storing every packet received, or a large subset of the packets received, in a high speed network. RAM, for example, is one type of storage device which is capable of functioning at a high rate of speed, and may be used as the first storage device.

As noted above, in some implementations network packets may be filtered for storage in the first storage device. For example, a programmable hardware processor may be configured to store—in the first storage device—only network packets SMTP protocol. As another example, a programmable hardware processor may be configured to avoid storing—in the first data storage device—certain types of network packets, e.g., network packets received from a particular range of IP addresses.

A programmable hardware processor determines that a particular network packet included in the network flow includes data meeting at least one condition defined by first programmable logic of the programmable hardware processor (404). For example, conditions may be i) that a network packet specifies a particular MAC address as the source of the network packet and ii) the network packet specifies a particular sender e-mail address, e.g., "example@example.com." Each SMTP packet obtained from the first storage device meets the condition only if the SMTP packet also specifies the particular e-mail and MAC address.

In response to determining that the particular network packet includes data meeting the at least one condition, data of interest is extracted from the particular network packet (406). For example, data of interest may be the sender e-mail address and recipient e-mail address(es) and, in response to determining that a particular SMTP packet meets the example conditions above, a sender e-mail address and recipient e-mail address may be extracted from the particular SMTP packet.

A programmable hardware processor stores, in a second storage device, i) the extracted data of interest, and ii) an identifier associated with the particular network packet (408). The identifier may be, for example, an identifier of the network flow that includes the particular network packet, an identifier that indicates the sender MAC address, and/or an identifier that indicates the sender e-mail address.

In some situations, certain data of interest may span multiple network packets. In this situation, a programmable hardware processor may determine that the data of interest is a portion of whole data, extract each portion of the whole data from each network packet that i) includes a portion of the whole data, and ii) is included in the network flow. As with the initial data of interest, the extracted portions of the whole data may be stored in the second storage device. In some implementations, whole data of interest is identified by combining each extracted portion of the whole data, and the whole data of interest is stored in the second storage device, e.g., in addition to or instead of each part being stored separately.

In some implementations, each of the network packets stored in the first storage device are organized according to the network flow identified for the network packet, and the extracted data of interest stored in the second storage device is organized according to the identifier associated with the particular network packet. By way of example, each network flow may be indexed according to an identifier for the network flow, while the extracted data of interest may be indexed according to an identifier for the network packet from which the data was extracted. Other types of identifiers and methods of organization may also be used. Organizing network packets and extracted data according to various identifiers, for example, facilitate searching the storage devices for certain packets or data of interest.

While some data of interest in the example above, e.g., the sender e-mail address, is also data that meets conditions defined by the first programmable logic, in some implementations the extracted data of interest is different from the data meeting conditions defined by the first programmable logic. For example, one configuration of a programmable hardware processor may specify DNS packet protocol as a condition and specify a domain name query as the data of interest. In other words, the data that results in a condition being met need not be data of interest to be extracted.

In some implementations, second programmable logic may be obtained for the programmable hardware processor, the second programmable logic defining a condition that is different from the condition(s) defined by the first programmable logic. For example, a second configuration may define a condition as HTTP protocol rather than SMTP protocol. Subsequent network packets may be received that are included in a second network flow. The programmable hardware processor may determine that a second network packet included in the second network flow includes data meeting the condition(s) defined by the second programmable logic and, in response, extract and store second data of interest from the second network packet. In some implementations, instead of or in addition to condition(s) being different, second programmable logic may define data of interest that is different from the data of interest specified by the first programmable logic. In addition, the manner in which data is organized, if organized at all, may also be specified differently in different programmable logic of various configurations.

In some implementations, additional stages of storage may be used to store network packets and/or network data with particular characteristics of interest. For example, from the extracted data stored in the second storage device, data extracted during a particular period of time may be identified and stored in an additional storage device.

In some implementations, a single stage of storage may have multiple storage devices for storing network packets with different characteristics of interest and/or for storing different types of network data of interest. For example, packets of interest may include packets specifying a particular source port or a particular destination port, and one storage device may be used to store packets specifying the particular source port, while another storage device may be used to store packets specifying the particular destination port. The source and destination ports may be included in the data of interest that is extracted and stored, separately, for the corresponding network packets.

In some implementations, new network packets are periodically received. Newly received network packets and their corresponding data may be stored and organized in the same manner as prior network packets, e.g., storing them according to their network flows and extracting data of interest in response to particular conditions being met. Newly received network packets may replace the first network packets received. For example, the first storage device may be periodically purged, or gradually overwritten as new packets replace older packets. In some implementations, newly received packets are assigned to a network flow and matched with an existing network flow to combine packets of the same flow. In some implementations, an existing flow may be identified for newly received packets prior to assigning a network flow to the newly received packets.

The extraction of data of interest from network packets may facilitate analysis of data included in network traffic traversing a network. For example, an administrator may be able to cause extraction of files sent through a network using a variety of communications protocols and store the files, along with other relevant packet data, in one or more storage devices. Having the extracted data available for inspection for a period of time after its transmission may facilitate investigation of potential problems that are not immediately recognizable, such as the propagation of a virus from a source operating on the administrator's network. Other devices, such as analytics devices designed to identify trends, security threats, and network anomalies, may also benefit from access to data extracted from network packets.

The foregoing disclosure describes a number of example implementations for extracting data from network communications. As detailed above, examples provide a mechanism for using programmable hardware processors to quickly identify network traffic containing data of interest, extract the data of interest, and store/organize the extracted data.

We claim:

1. A computing device for extracting data from network communications, the computing device comprising a programmable hardware processor configured to:
receive a first set of network packets;
store each network packet included in the first set in a first storage device;
identify, from each network packet included in a subset of the first set of network packets, data included in the network packet, the data meeting at least one condition defined by first programmable logic of the programmable hardware processor; and
for each network packet included in the subset:
extract, from the network packet, data of interest; and
store, in a second storage device, i) the extracted data of interest, and ii) an identifier associated with the network packet.

2. The computing device of claim 1, wherein the programmable hardware processor is further configured to:

identify, for each network packet included in the first set, a network flow, each network flow including at least one of the network packets included in the first set; and for each network packet included in the subset, organize the network packet according to the network flow identified for the network packet.

3. The computing device of claim 2, wherein the programmable hardware processor is further configured to:

determine that particular data of interest identified in a particular network packet is partial data;

identify a particular network flow that includes the particular network packet; and identify other network packets included in the particular network flow, the other network packets including other partial data that, when combined with the partial data of the particular network packet, comprise the particular data of interest.

4. The computing device of claim 3, wherein the programmable hardware processor is further configured to:

combine the extracted data of interest from the particular network packet and each other network packet included in the particular network flow, and wherein storing the extracted data of interest comprises storing the combined extracted data of interest.

5. The computing device of claim 1, wherein the data of interest comprises at least one of:

network packet header data;
network packet payload data;
network packet footer data; or
network packet metadata.

6. The computing device of claim 1, wherein the data meeting the at least one condition defined by first programmable logic is included in at least one of:

network packet header data;
network packet payload data;
network packet footer data; or
network packet metadata.

7. The computing device of claim 2, wherein, for each network packet included in the subset, the identifier associated with the network packet is based on the network flow in which the network packet is included.

8. The computing device of claim 1, wherein the programmable hardware processor is further configured to:

obtain second programmable logic for the programmable hardware processor, the second programmable logic defining a condition that is different from the at least one condition defined by the first programmable logic;

receive, subsequent to receiving the first set of network packets, a second set of network packets;

store each network packet included in the second set in the first storage device;

identify, from each network packet included in a second subset of the second set of network packets, second data included in the network packet, the second data meeting at least one condition defined by the second programmable logic of the programmable hardware processor; and for each network packet included in the second subset:
  extract, from the network packet, second data of interest; and
  store, in the second storage device, i) the extracted second data of interest, and ii) a second identifier associated with the network packet.

9. A method for extracting data from network communications, implemented by a programmable hardware processor, the method comprising:

obtaining at least one network packet from a first storage device, each of the at least one network packet being included in a network flow;

determining that a particular network packet included in the network flow includes data meeting at least one condition defined by first programmable logic of the programmable hardware processor;

in response to determining that the particular network packet includes data meeting the at least one condition:
  extracting, from the particular network packet, data of interest; and
  storing, in a second storage device, i) the extracted data of interest, and ii) an identifier associated with the particular network packet.

10. The method of claim 9, further comprising:

determining that the data of interest is a portion of whole data;

extracting each portion of the whole data from each network packet that i) includes a portion of the whole data, and ii) is included in the network flow; and storing, in the second storage device, each extracted portion of the whole data.

11. The method of claim 10, further comprising:

generating whole data of interest by combining each extracted portion of the whole data, and wherein storing each extracted portion of the whole data comprises storing the whole data of interest.

12. The method of claim 9, wherein the extracted data of interest:

is defined by the first programmable logic; and
includes data that is different from the data meeting the at least one condition.

13. The method of claim 9, further comprising:

obtaining second programmable logic for the programmable hardware processor, the second programmable logic defining a condition that is different from the at least one condition defined by the first programmable logic;

receiving, subsequent to the obtaining the at least one network packet, at least one second network packet from the first storage device, the at least one second network packet being included in a second network flow;

determining that a particular second network packet included in the second network flow includes second data meeting at least one condition defined by the second programmable logic;

in response to determining that the particular second network packet includes second data meeting the at least one condition:
  extracting, from the particular second network packet, second data of interest; and
  storing, in the second storage device, i) the extracted second data of interest, and ii) an identifier associated with the particular second network packet.

14. The method of claim 9, further comprising:

receiving a plurality of network packets;

identifying, for each of the plurality of network packets, a network flow, each network flow including at least one of the plurality of network packets; and storing each of the plurality of network packets in the first storage device.

15. The method of claim 14, further comprising:

organizing each of the plurality of network packets stored in the first storage device according to the network flow identified for the network packet;

organizing the extracted data of interest stored in the second storage device according to the identifier associated with the particular network packet.

* * * * *